United States Patent
Wu et al.

(10) Patent No.: US 11,780,773 B1
(45) Date of Patent: Oct. 10, 2023

(54) GROUTING MATERIAL FOR MODIFYING MUDSTONE, PREPARATION METHOD AND APPLICATION THEREOF

(71) Applicant: CHINA UNIVERSITY OF MINING AND TECHNOLOGY, Xuzhou (CN)

(72) Inventors: Jiangyu Wu, Xuzhou (CN); Dan Ma, Xuzhou (CN); Hai Pu, Xuzhou (CN); Qian Yin, Xuzhou (CN); Haixiang Zhang, Xuzhou (CN); Zhengfu Bian, Xuzhou (CN); Liyuan Yu, Xuzhou (CN); Hongwen Jing, Xuzhou (CN); Shuo Yang, Xuzhou (CN); Yiming Wang, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 18/300,462

(22) Filed: Apr. 14, 2023

(30) Foreign Application Priority Data

Aug. 3, 2022 (CN) .......................... 202210926940.8

(51) Int. Cl.
| | |
|---|---|
| *C04B 18/14* | (2006.01) |
| *C04B 24/42* | (2006.01) |
| *C04B 14/46* | (2006.01) |
| *C04B 16/06* | (2006.01) |
| *C04B 24/30* | (2006.01) |
| *C04B 24/28* | (2006.01) |
| *C04B 111/70* | (2006.01) |
| *C04B 111/27* | (2006.01) |
| *C04B 111/00* | (2006.01) |

(52) U.S. Cl.
CPC ........ *C04B 18/146* (2013.01); *C04B 14/4643* (2013.01); *C04B 16/0633* (2013.01); *C04B 24/282* (2013.01); *C04B 24/283* (2013.01); *C04B 24/307* (2013.01); *C04B 24/42* (2013.01); *C04B 2111/00008* (2013.01); *C04B 2111/27* (2013.01); *C04B 2111/70* (2013.01); *C04B 2201/50* (2013.01)

(58) Field of Classification Search
CPC .............. C04B 18/146; C04B 14/4643; C04B 16/0633; C04B 24/282; C04B 24/283; C04B 24/307; C04B 24/42; C04B 2111/00008; C04B 2111/27; C04B 2111/70; C04B 2201/50
See application file for complete search history.

(56) References Cited

FOREIGN PATENT DOCUMENTS

| | | |
|---|---|---|
| CN | 102936113 A | 2/2013 |
| CN | 105523732 A | 4/2016 |
| CN | 107619236 A | 1/2018 |
| CN | 111018434 A | 4/2020 |
| CN | 114180930 A | 3/2022 |
| JP | H10259042 A | 9/1998 |

*Primary Examiner* — Anthony J Green
(74) *Attorney, Agent, or Firm* — Kaplan Breyer Schwarz, LLP; Stuart H. Mayer

(57) ABSTRACT

Disclosed are a grouting material for modifying mudstone, a preparation method and an application thereof, belonging to the technical field of material science and geotechnical engineering. The grouting material for modifying mudstone includes the following raw materials: cement, water, superfine micronized powder, water reducer, silane, fiber, diatomite, urea-formaldehyde resin and waterborne polyurethane. The preparation method of the grouting material for modifying mudstone includes steps of: (1) weighing the raw materials in parts by weight, mixing water of 40% of a total amount of water with water reducer, superfine micronized powder, fiber and diatomite, stirring to obtain a material A; (2) adding silane, urea-formaldehyde resin, waterborne polyurethane and residual water into the material A, obtaining a material B after continuous stirring; and (3) adding cement into the material B, and uniformly stirring to obtain the grouting material for modifying mudstone.

7 Claims, 4 Drawing Sheets

GROUTING MATERIAL FOR MODIFYING MUDSTONE, PREPARATION METHOD AND APPLICATION THEREOF

CROSS-REFERENCE TO RELATED APPLICATIONS

This application claims priority to Chinese Patent Application No. 202210926940.8, filed on Aug. 3, 2022, the contents of which are hereby incorporated by reference.

TECHNICAL FIELD

The present application relates to a grouting material for modifying mudstone and a preparation method and application thereof, and belongs to the technical field of material science and geotechnical engineering.

BACKGROUND

In the process of underground mining, a series of tunnels and chambers are excavated in order to extract coal resources or other useful solid deposits buried deep underground, and mobile mining operations are also located and maintained underground, creating a vast underground space. Once abandoned, these underground spaces not only pose huge safety hazards, such as water and gas surges, to the future development of underground spaces and the extraction of useful minerals in adjacent areas, but also cause a number of environmental problems, such as land subsidence.

Pumped storage technology provides the most reliable, economical and technologically advanced large-scale energy storage device with long-service and high-capacity in the power system, utilizing surplus power from the power system to pump water to high places for storage and releasing water to generate electricity when the power system is short of power. The underground space of abandoned mines creates unique conditions for the construction of underground reservoirs for pumped storage power stations, whereby pumped storage in the underground space of abandoned mines can both effectively use the underground space of abandoned coal mines and realize the large-scale use of renewable energy, and also prevent the occurrence of geological disasters in abandoned mines.

As exploiting the abandoned mines as underground reservoirs, the durability of the surrounding rocks for supporting the original tunnel should be considered under the condition of long-term and frequent pumping water; in this regard, grouting materials are required to reinforce the tunnel surrounding rocks in the process of pumped energy storage by using abandoned underground space; moreover, the reservoir of the abandoned mine for pumped storage power station is required to be airtight, which necessitates the consideration of water leakage from the tunnel surrounding rock in order to prevent leakage of circulating water, while traditional grouting materials only address the safety and stability of the tunnel surrounding rock, but in the presence of circulating water, reinforcement cannot be achieved and water will penetrate and deteriorate the mudstone skeleton, therefore, a grouting material suitable for use in the pumped storage process in underground spaces needs is required.

SUMMARY

To address the above technical problems, the present application provides a grouting material for modifying mudstone and its preparation method and application, whereby the mudstone in the underground space is modified by the grouting material to have superhydrophobic properties while being resistant to the impact of circulating water, and may therefore be used in the process of pumping water for energy storage in the underground space of abandoned mines with effectiveness.

In order to achieve the above objectives, the present application provides the following technical schemes:

a grouting material for modifying mudstone, including the following raw materials in parts by weight:

100 parts of cement, 150-180 parts of water, 3-6 parts of superfine micronized powder, 2-4 parts of water reducer, 1-5 parts of silane, 4-6 parts of fiber, 20-40 parts of diatomite, 2-5 parts of urea-formaldehyde resin and 5-10 parts of waterborne polyurethane.

Optionally, the grouting material includes the following raw materials in parts by weight:

100 parts of cement, 175 parts of water, 4 parts of superfine micronized powder, 4 parts of water reducer, 3 parts of silane, 6 parts of fiber, 28 parts of diatomite, 3 parts of urea-formaldehyde resin and 7 parts of waterborne polyurethane.

Optionally, the cement is ordinary portland cement.

Optionally, the superfine micronized powder includes nano-silica, silica fume, fly ash, and lime in a mass ratio of (10-15):(4-8):(6-12):(5-8), and a preparation method includes the following steps: weighing the nano-silica, silica fume, fly ash, and lime according to the mass ratio, followed by stirring at 200 revolutions per minute (rpm) and mixing for 10 minutes (min) to obtain the superfine micronized powder.

Optionally, in the superfine micronized powder, the nano-silica is hydrophobic nano-silica that improves the grouting material in terms of surface hydrophobic property; silica fume is an ultra-fine siliceous powder material formed by rapid oxidation and condensation of $SiO_2$ and Si gas produced during smelting of ferrosilicon alloys and industrial silicon with oxygen in an air; fly ash is a fine ash collected from flue gas after coal combustion, and is a major solid waste discharged from coal-fired power plants, with a main oxide composition of: $SiO_2$, $Al_2O_3$, FeO, $Fe_2O_3$, CaO and $TiO_2$.

Optionally, the superfine micronized powder has a particle size of 5-10 micrometers (km), and a specific surface area of 600-750 square meters per kilogram ($m^2$/kg).

Optionally, the water reducer is a polycarboxylic type water reducer.

Optionally, the fiber is composed of basalt fiber and polypropylene fiber with a mass ratio of 3:7, and the fiber has a diameter of 5-8 km and a length of 60-85 km.

Optionally, the silane is isobutyl triethoxysilane with hydrophobicity.

The present application also provides a preparation method of the grouting material for modifying mudstone, including steps as follows:

S1, weighing the raw materials in parts by weight, mixing water of 40 percent (%) of a total amount of water with water reducer, superfine micronized powder, fiber and diatomite, stirring to obtain a material A;

S2, adding silane, urea-formaldehyde resin, waterborne polyurethane and residual water into the material A, obtaining a material B after continuous stirring; and S3, adding cement into the material B, and uniformly stirring to obtain the grouting material for modifying mudstone.

Optionally, the S1 includes stirring at 500 rpm for 5-10 min, the S2 includes stirring at 250 rpm for 15 min, and the S3 includes stirring at 500 rpm for 30 min.

An application of the grouting material for modifying mudstone in pumped energy storage by using underground space of abandoned mines is also provided by the present application.

The present application discloses the following technical effects:

mudstone in the underground space of abandoned mines usually contains easily excitable active substances such as montmorillonite; to activate the cementing interface between the mudstone and the grouting material, the grouting material prepared by the present application contains superfine micronized powders such as silica fume and lime, and the calcium hydroxide formed by hydration has an alkali excitation effect on the montmorillonite and other components in the mudstone, which further promotes the participation of the mudstone in the reaction to compound the grouting material and increases the bonding ability of the grouting material with the mudstone, and the superfine micronized powders also contain substances such as silica and aluminium trioxide, which further generate new polymers in contact with the circulating water and make the grouting material more water stable;

moreover, basalt fibers are highly compatible and have excellent mechanical properties, while polypropylene fibers are elastic and light in weight; in the present application, the two fibers are stirred together to form a large number of interlocking mesh structures between the fiber particles, thereby increasing the resistance of the grouting material to the impact of circulating water, as well as increasing the viscosity of the grouting material, making the material adhere efficiently to the mudstone and improving the overall stability of the grouted stone body;

the waterborne polyurethane added in this application allows for rapid gelling of the grouting material immediately after the formation of a water seepage channel so as to prevent water seepage; the urea-formaldehyde resin expands in response to water and provides a good impermeable sealing effect; silane and nano-silica are hydrophobic chemicals that form a hydrophobic layer of carbon chains connected by silicone hydroxyl groups on the surface of the grouting material, converting the hydrophilic cement into a hydrophobic one, therefore effectively reducing the contact area of the grouting material with water and improving stability; and the grouting material of the present application is super-hydrophobic and resistant to the impact of circulating water, and has a simple preparation method that allows it to be used effectively in the process of pumped energy storage in underground spaces of abandoned mines.

BRIEF DESCRIPTION OF THE DRAWINGS

For a clearer illustration of the technical schemes in the embodiments of the present application or in the prior art, a brief description of the accompanying drawings to be used in the embodiments are given below. It is obvious that the accompanying drawings in the following description are only some embodiments of the present application and that other drawings are available to a person of ordinary skill in the art without creative labour.

DETAILED DESCRIPTION OF THE EMBODIMENTS

Figure 1:
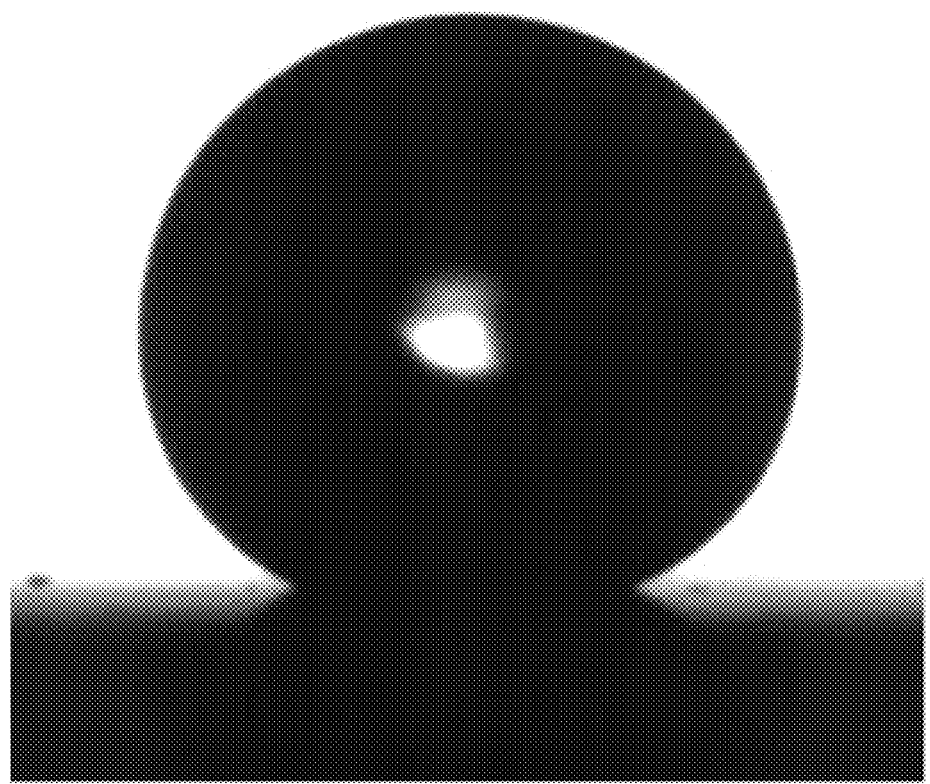
FIG. 1 illustrates surface super-hydrophobicity of a grouting material for modifying mudstone prepared in Embodiment 1 of the present application.

Various exemplary embodiments of the present application are now described in detail and this detailed description should not be considered a limitation of the present application, but should be understood as a more detailed description of certain aspects, features and embodiments of the present application.

It is to be understood that the terms described in the present application are intended to describe particular embodiments only and are not intended to limit the present application. Further, with respect to the range of values in the present application, it is to be understood that each intermediate value between the upper and lower limits of the range is also specifically disclosed. Each smaller range between any stated value or intermediate value within a stated range and any other stated value or intermediate value within a stated range is also included in the present application. The upper and lower limits of these smaller ranges may be independently included or excluded from the scope.

Unless otherwise stated, all technical and scientific terms used herein have the same meaning as commonly understood by those of ordinary skill in the field described in the present application. Although the present application describes only preferred methods and materials, any methods and materials similar or equivalent to those described herein may also be used in the implementation or testing of the present application. All literature referred to in this specification is incorporated by reference for the purpose of disclosing and describing the methods and/or materials associated with said literature. In the event of conflict with any incorporated literature, the contents of this specification shall prevail.

Without departing from the scope or spirit of the present application, various improvements and variations may be made to specific embodiments of the specification of the present application, as will be apparent to those skilled in the art. Other implementations derived from the specification of the present application will be obvious to the skilled person. The specification and embodiments of the present application are only exemplary.

The terms "including", "comprising", "having" and "containing" used in this specification are all open terms, which means including but not limited to.

The present application provides a grouting material for modifying mudstone, including the following raw materials in parts by weight:

100 parts of cement, 150-180 parts of water, 3-6 parts of superfine micronized powder, 2-4 parts of water reducer, 1-5 parts of silane, 4-6 parts of fiber, 20-40 parts of diatomite, 2-5 parts of urea-formaldehyde resin and 5-10 parts of waterborne polyurethane.

Optionally, according to parts by weight, it includes the following raw materials:

100 parts of cement, 175 parts of water, 4 parts of superfine micronized powder, 4 parts of water reducer, 3 parts of silane, 6 parts of fiber, 28 parts of diatomite, 3 parts of urea-formaldehyde resin and 7 parts of waterborne polyurethane.

Optionally, the cement is ordinary portland cement, and the ordinary portland cement used in this embodiment of the present application is commercially purchased PO42.5 cement of Huarun Runfeng brand.

Optionally, the superfine micronized powder consists of nano-silica, silica fume, fly ash, and lime in a mass ratio of (10-15):(4-8):(6-12):(5-8), and a preparation method in the present embodiment of the superfine micronized powder includes: weighing the nano-silica, silica fume, fly ash, and lime according to the mass ratio, stirring at 200 revolutions per minute (rpm) and mixing for 10 minutes (min) to prepare the superfine micronized powder. The nano-silica used herein is purchased from Beijing Deke Daojin Science and Technology Co., Ltd., the silica fume is purchased from the Sichuan Langtian Resource Comprehensive Utilization Co., Ltd, and the fly ash and the lime are both purchased from the Guangmao Mineral Products Processing Plant of Lingshou County.

Optionally, in the superfine micronized powder, the nano-silica is hydrophobic nano-silica that improves the grouting material in terms of surface hydrophobic property; silica fume is an ultra-fine siliceous powder material formed by rapid oxidation and condensation of $SiO_2$ and Si gas produced during smelting of ferrosilicon alloys and industrial silicon with oxygen in an air; fly ash is a fine ash collected from flue gas after coal combustion, and is a major solid waste discharged from coal-fired power plants, with a main oxide composition of: $SiO_2$, $Al_2O_3$, FeO, $Fe_2O_3$, CaO and $TiO_2$.

Optionally, the superfine micronized powder has a particle size of 5-10 micrometers (μm), and a specific surface area of 600-750 square meters per kilogram ($m^2/kg$).

Optionally, the water reducer is a polycarboxylic type water reducer, and the water reducer is purchased from the Qingdao Huide Xinke Building Materials Co., Ltd.

Optionally, the fiber is composed of basalt fiber and polypropylene fiber with a mass ratio of 3:7, and the fiber has a diameter of 5-8 μm and a length of 60-85 μm. In the present application, the basalt fiber is purchased from Shandong Changyuan New Material Technology Co., Ltd., and the polypropylene fiber is purchased from Qingdao Huide Xinke Building Materials Co., Ltd.

Optionally, the silane is isobutyl triethoxysilane, and the silane used in the embodiments of the present application is purchased from Kehui (Henan) New Materials Technology Co., Ltd., and the silane hydrophobic.

Figure 4:
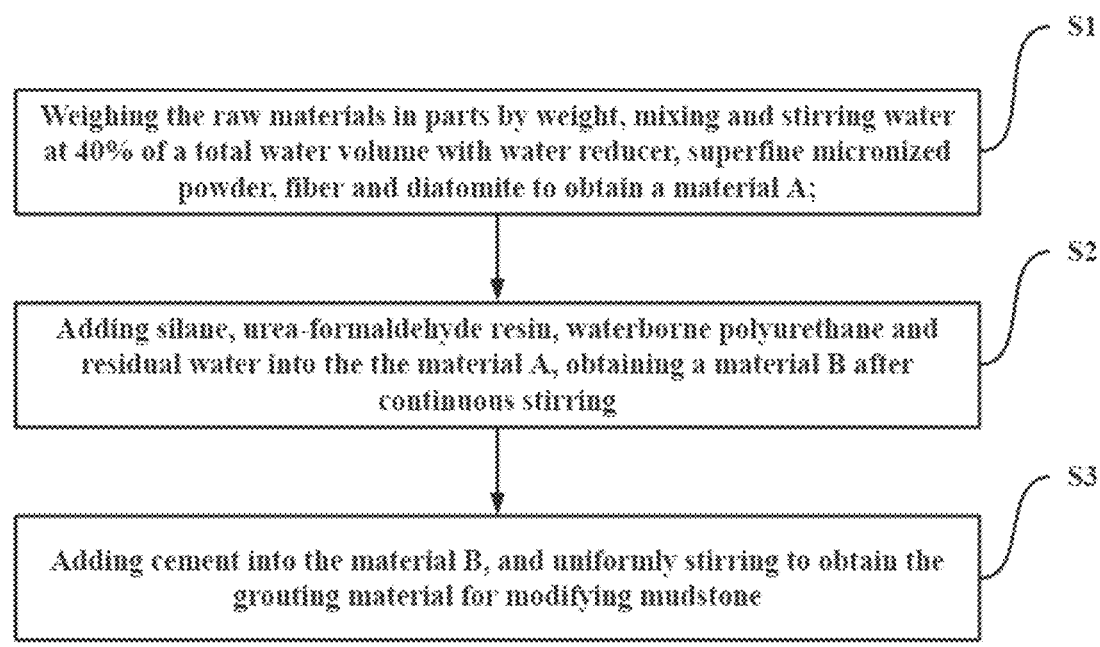
FIG. 4 illustrates a preparation method of a grouting material for modifying mudstone of the present application.

The present application also provides a preparation method of the grouting material for modifying mudstone as shown in FIG. 4, including steps as follows:

S1, weighing the raw materials in parts by weight, mixing water of 40 percent (%) of a total amount of water with water reducer, superfine micronized powder, fiber and diatomite, stirring to obtain a material A;

S2, adding silane, urea-formaldehyde resin, waterborne polyurethane and residual water into the material A, obtaining a material B after continuous stirring; and S3, adding cement into the material B, and uniformly stirring to obtain the grouting material for modifying mudstone.

Optionally, there is generally no special limitation on the stirring duration and speed during the preparation of the grouting material, but in order to meet the performance requirements of the grouting material, the preferred stirring speed and duration of each step in the preparation process are: 5-10 min at 500 rpm in S1, 15 min at 250 rpm in S2 and 30 min at 500 rpm in S3.

The present application also provides an application of the grouting material for modifying mudstone in pumped energy storage by using underground space of abandoned mines.

The grouting process of the present application is a conventional technique in the field, it is not a point of invention and therefore will not be further elaborated.

The technical scheme of the present application is further explained by embodiments.

Embodiment 1

(1) In parts by weight, weighing 100 parts of cement, 175 parts of water, 4 parts of superfine micronized powder (composed of nano-silica, fly ash and lime in a mass ratio of 10:5:7:6), 4 parts of polycarboxylic type water reducer, 3 parts of isobutyl triethoxysilane, 6 parts of fiber (basalt fiber and polypropylene fiber with mass ratio of 3:7), 28 parts of diatomite, 3 parts of urea-formaldehyde resin and 7 parts of waterborne polyurethane for later use; mixing 70 parts of water with polycarboxylic type water reducer, superfine micronized powder, fiber and diatomite by stirring at 500 rpm for 6 min to obtain a material A;

(2) adding isobutyl triethoxysilane, urea-formaldehyde resin, waterborne polyurethane and 105 parts of water into the material A, followed by stirring at 250 rpm for 15 min to obtain a material B; and (3) adding cement into the material B, and stirring at 500 rpm for 30 min to obtain a grouting material for modifying mudstone.

Embodiment 2

(1) In parts by weight, weighing 100 parts of cement, 150 parts of water, 3 parts of superfine micronized powder (composed of nano-silica, fly ash and lime in a mass ratio of 12:5: 6:6), 2 parts of polycarboxylic type water reducer, 5 parts of isobutyl triethoxysilane, 6 parts of fiber (basalt fiber and polypropylene fiber with mass ratio of 3:7), 40 parts of diatomite, 5 parts of urea-formaldehyde resin and 10 parts of waterborne polyurethane for later use; mixing 60 parts of water with polycarboxylic type water reducer, superfine micronized powder, fiber and diatomite by stirring at 500 rpm for 7 min to obtain a material A;

(2) adding isobutyl triethoxysilane, urea-formaldehyde resin, waterborne polyurethane and 90 parts of water into the material A, followed by stirring at 250 rpm for 15 min to obtain a material B; and (3) adding cement into the material B, and stirring at 500 rpm for 30 min to obtain a grouting material for modifying mudstone.

Embodiment 3

(1) In parts by weight, weighing 100 parts of cement, 180 parts of water, 6 parts of superfine micronized powder (composed of nano-silica, fly ash and lime in a mass ratio of 10:6:10:6), 4 parts of polycarboxylic type water reducer, 1 part of isobutyl triethoxysilane, 4 parts of fiber (basalt fiber and polypropylene fiber with mass ratio of 3:7), 20 parts of diatomite, 2 parts of urea-formaldehyde resin and 5 parts of waterborne polyurethane for later use; mixing 72 parts of water with polycarboxylic type water reducer, superfine micronized powder, fiber and diatomite by stirring at 500 rpm for 5 min to obtain a material A;

(2) adding isobutyl triethoxysilane, urea-formaldehyde resin, waterborne polyurethane and 108 parts of water into the material A, followed by stirring at 250 rpm for 15 min to obtain a material B; and (3) adding cement into the material B, and stirring at 500 rpm for 30 min to obtain a grouting material for modifying mudstone.

Embodiment 4

(1) In parts by weight, weighing 100 parts of cement, 135 parts of water, 4 parts of superfine micronized powder (composed of nano-silica, fly ash and lime in a mass ratio of 10:4:12:8), 4 parts of polycarboxylic type water reducer, 1 part of isobutyl triethoxysilane, 5 parts of fiber (basalt fiber and polypropylene fiber with mass ratio of 3:7), 35 parts of diatomite, 3 parts of urea-formaldehyde resin and 7 parts of waterborne polyurethane for later use; mixing 54 parts of water with polycarboxylic type water reducer, superfine micronized powder, fiber and diatomite by stirring at 500 rpm for 10 min to obtain a material A;

(2) adding isobutyl triethoxysilane, urea-formaldehyde resin, waterborne polyurethane and 81 parts of water into the material A, followed by stirring at 250 rpm for 15 min to obtain a material B; and (3) adding cement into the material B, and stirring at 500 rpm for 30 min to obtain a grouting material for modifying mudstone.

Embodiment 5

(1) In parts by weight, weighing 100 parts of cement, 160 parts of water, 5 parts of superfine micronized powder (composed of nano-silica, fly ash and lime in a mass ratio of 15:8:6:5), 4 parts of polycarboxylic type water reducer, 2 parts of isobutyl triethoxysilane, 4 parts of fiber (basalt fiber and polypropylene fiber with mass ratio of 3:7), 30 parts of diatomite, 4 parts of urea-formaldehyde resin and 5 parts of waterborne polyurethane for later use; mixing 64 parts of water with polycarboxylic type water reducer, superfine micronized powder, fiber and diatomite by stirring at 500 rpm for 10 min to obtain a material A;

(2) adding isobutyl triethoxysilane, urea-formaldehyde resin, waterborne polyurethane and 96 parts of water into the material A, followed by stirring at 250 rpm for 15 min to obtain a material B; and (3) adding cement into the material B, and stirring at 500 rpm for 30 min to obtain a grouting material for modifying mudstone.

Comparative Embodiment 1

The present comparative embodiment is different from the Embodiment 1 by including 100 parts of cement, 100 parts of water, 7 parts of superfine micronized powder (composed of nano-silica, fly ash and lime in a mass ratio of 15:5:8:6), 5 parts of polycarboxylic type water reducer, 9 parts of isobutyl triethoxysilane, 7 parts of fiber (basalt fiber and polypropylene fiber with mass ratio of 3:7), 15 parts of diatomite, 1 part of urea-formaldehyde resin and 12 parts of waterborne polyurethane in parts by weight.

Comparative Embodiment 2

Same as Embodiment 1, except that no superfine micronized powder is added.

Comparative Embodiment 3

Same as Embodiment 1, except that the superfine micronized powder is composed of nano-silica and silica fume in a mass ratio of 10:5.

Comparative Embodiment 4

Same as Embodiment 1, except that no fiber is added.

Comparative Embodiment 5

(1) In parts by weight, weighing 100 parts of cement, 175 parts of water, 4 parts of superfine micronized powder (composed of nano-silica, fly ash and lime in a mass ratio of 10:5:7:6), 4 parts of polycarboxylic type water reducer, 3 parts of isobutyl triethoxysilane, 6 parts of fiber (basalt fiber and polypropylene fiber with mass ratio of 3:7), 28 parts of diatomite, 3 parts of urea-formaldehyde resin and 7 parts of waterborne polyurethane for later use; mixing water with polycarboxylic type water reducer, superfine micronized powder, fiber, diatomite and isobutyl triethoxysilane by stirring at 500 rpm for 6 min to obtain a material A;

(2) adding cement into the material A, and stirring at 500 rpm for 30 min to obtain a grouting material for modifying mudstone.

Performance Test

Determination of Water Contact Angle

Figure 2:
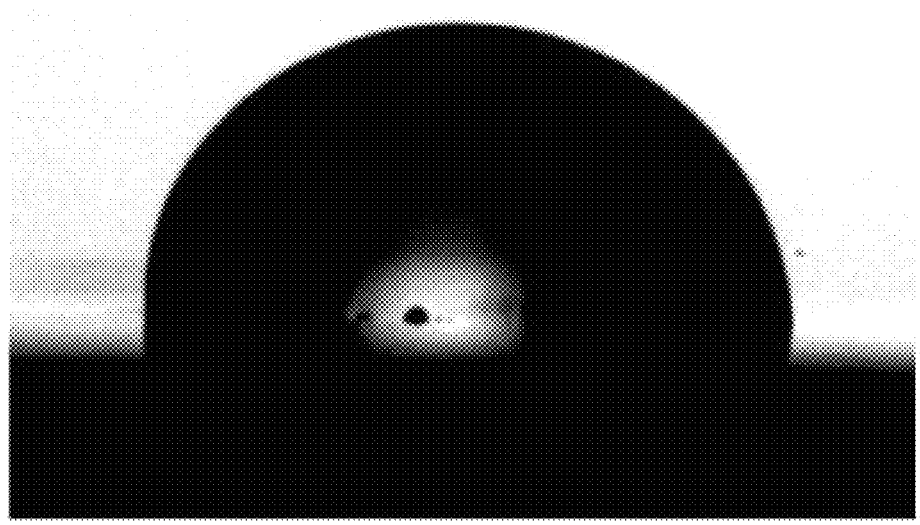
FIG. 2 is a diagram showing surface hydrophobicity of a grouting material for modifying mudstone prepared in Comparative embodiment 1 of the present application.
Figure 3:
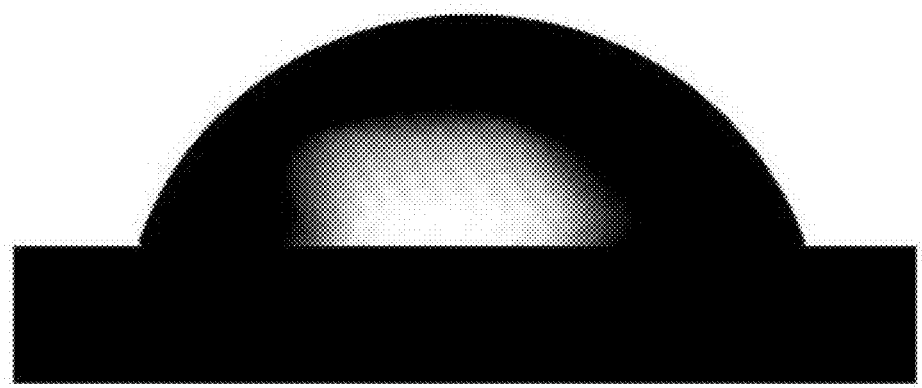
FIG. 3 illustrates surface hydrophilicity of a grouting material for modifying mudstone prepared in Comparative embodiment 2 of the present application.

FIG. 1 shows a super-hydrophobic diagram of a surface of a grouting material for modifying mudstone prepared in Embodiment 1 of the present application, FIG. 2 shows a surface hydrophobic diagram of a grouting material for modifying mudstone prepared in Comparative embodiment 1 of the present application, and FIG. 3 illustrates surface hydrophilicity of a grouting material for modifying mudstone prepared in Comparative embodiment 2 of the present application. The grouting materials prepared in Embodiments 1-5 and Comparative embodiments 1-5 are used to grout the crushed mudstone respectively with a mass ratio of 1:4 between the grouting material and the crushed mudstone during the grouting process to obtain a aggregated mass, and the contact angle of water on the surface of the obtained aggregated mass is measured, with the results shown in Table 1.

TABLE 1

Water contact angle measurement results on the surface of grouted stones in each group

| | Contact angle (°) |
|---|---|
| Embodiment 1 | 155 |
| Embodiment 2 | 150 |
| Embodiment 3 | 149 |
| Embodiment 4 | 146 |
| Embodiment 5 | 150 |
| Comparative embodiment 1 | 93 |
| Comparative embodiment 2 | 49 |
| Comparative embodiment 3 | 89 |

TABLE 1-continued

Water contact angle measurement results on the
surface of grouted stones in each group

|  | Contact angle (°) |
| --- | --- |
| Comparative embodiment 4 | 131 |
| Comparative embodiment 5 | 128 |

From the data in Table 1, it can be seen that the grouting materials prepared by the embodiments of the present application form a hydrophobic surface on the surface of the aggregated mass after grouting, while the surfaces of the aggregated masses prepared by changing the addition amount and type of superfine micronized powder in Comparative embodiments 2 and 3 become hydrophilic, and the hydrophobic property disappears, indicating that the superfine micronized powder improves the hydrophobic property of the grouting material.

Mechanics Performance Testing

According to *Technical Code for Waterproofing of Underground Works* (GB50108-2001) and *Code for Acceptance of Construction Quality of Underground Waterproof* (GB50208-2002), the retention rate of grouting materials in the aggregated masses, as well as the compressive strength and water permeability after 28 days are determined, see Table 2 for the results.

TABLE 2

Measurement results of mechanical properties and
retention rate of grouting materials

|  | 28d compressive strength (MPa) | Permeability (cm/s) | Retention rate (%) |
| --- | --- | --- | --- |
| Embodiment 1 | 44.8 | $4.2 \times 10^{-7}$ | 95.61 |
| Embodiment 2 | 40.3 | $5.6 \times 10^{-7}$ | 94.32 |
| Embodiment 3 | 39.8 | $4.8 \times 10^{-7}$ | 89.56 |
| Embodiment 4 | 41.4 | $5.0 \times 10^{-7}$ | 90.78 |
| Embodiment 5 | 42.1 | $4.9 \times 10^{-7}$ | 88.47 |
| Comparative embodiment 1 | 11.2 | $3.1 \times 10^{-7}$ | 45.69 |
| Comparative embodiment 2 | 8.9 | $2.5 \times 10^{-7}$ | 31.20 |
| Comparative embodiment 3 | 9.8 | $2.6 \times 10^{-7}$ | 32.12 |
| Comparative embodiment 4 | 9.9 | $3.7 \times 10^{-7}$ | 45.18 |
| Comparative embodiment 5 | 11.0 | $4.0 \times 10^{-7}$ | 55.39 |

As can be seen from Table 2, the aggregated mass obtained by grouting of the grouting material of the embodiments of the present application still has a good mechanical strength at 28 d and achieves a retention rate of more than 95% at a water flow rate of 0.8 centimeters per second (cm/s), indicating that the grouting material prepared by the present application is resistant to the impact of circulating water and is suitable for pumped energy storage in underground spaces of abandoned mines.

The above-mentioned embodiments only describe the preferred mode of the present application, and do not limit the scope of the present application. Under the premise of not departing from the design spirit of the invention, various modifications and improvements made by ordinary technicians in the field to the technical scheme of the present application shall fall within the protection scope determined by the claims of the present application.

What is claimed is:

1. A grouting material for modifying mudstone, comprising raw materials in parts by weight as follows:
   100 parts of cement, 150-180 parts of water, 3-6 parts of superfine micronized powder, 2-4 parts of water reducer, 1-5 parts of silane, 4-6 parts of fiber, 20-40 parts of diatomite, 2-5 parts of urea-formaldehyde resin and 5-10 parts of waterborne polyurethane;
   wherein the superfine micronized powder comprises nano-silica, silica fume, fly ash, and lime in a mass ratio of (10-15):(4-8):(6-12):(5-8); and
   the fiber is composed of basalt fiber and polypropylene fiber with a mass ratio of 3:7, and the fiber has a diameter of 5-8 μm and a length of 60-85 μm.

2. The grouting material for modifying mudstone according to claim 1, wherein the raw materials are comprised in parts by weight as follows:
   100 parts of cement, 175 parts of water, 4 parts of superfine micronized powder, 4 parts of water reducer, 3 parts of silane, 6 parts of fiber, 28 parts of diatomite, 3 parts of urea-formaldehyde resin, and 7 parts of waterborne polyurethane.

3. The grouting material for modifying mudstone according to claim 1, wherein the superfine micronized powder has a particle size of 5-10 m, and a specific surface area of 600-750 m2/kg.

4. The grouting material for modifying mudstone according to claim 1, wherein the water reducer is a polycarboxylic water reducer.

5. The grouting material for modifying mudstone according to claim 1, wherein the silane is isobutyl triethoxysilane.

6. A preparation method of the grouting material for modifying mudstone according to claim 1, comprising steps as follows:
   (1) weighing the raw materials in parts by weight, mixing water of 40% of a total amount of water with water reducer, superfine micronized powder, fiber and diatomite, stirring to obtain a material A;
   (2) adding silane, urea-formaldehyde resin, waterborne polyurethane and residual water into the material A, and obtaining a material B after continuous stirring; and
   (3) adding cement into the material B, and uniformly stirring to obtain the grouting material for modifying mudstone.

7. The preparation method according to claim 6, wherein step (1) comprises stirring at 500 rpm for 5-10 min, step (2) comprises stirring at 250 rpm for 15 min, and step (3) comprises stirring at 500 rpm for 30 min.

\* \* \* \* \*